United States Patent
Galle

(10) Patent No.: US 11,624,253 B2
(45) Date of Patent: Apr. 11, 2023

(54) ROV-BASED SUBSEA WELL INTERVENTION CAP

(71) Applicant: Dril-Quip, Inc., Houston, TX (US)

(72) Inventor: Gary L. Galle, Houston, TX (US)

(73) Assignee: Dril-Quip, Inc., Houston, TX (US)

(*) Notice: Subject to any disclaimer, the term of this patent is extended or adjusted under 35 U.S.C. 154(b) by 0 days.

(21) Appl. No.: 17/065,153

(22) Filed: Oct. 7, 2020

(65) Prior Publication Data

US 2021/0108480 A1 Apr. 15, 2021

Related U.S. Application Data

(60) Provisional application No. 62/912,902, filed on Oct. 9, 2019.

(51) Int. Cl.
| | |
|---|---|
| *E21B 33/035* | (2006.01) |
| *E21B 41/00* | (2006.01) |
| *E21B 41/04* | (2006.01) |

(52) U.S. Cl.
CPC ........ *E21B 33/035* (2013.01); *E21B 41/0007* (2013.01); *E21B 41/04* (2013.01)

(58) Field of Classification Search
CPC ..... E21B 33/035; E21B 41/0007; E21B 41/04
USPC ........................................................ 166/341
See application file for complete search history.

(56) References Cited

U.S. PATENT DOCUMENTS

| | | | |
|---|---|---|---|
| 9,103,473 B2 * | 8/2015 | Hestetun .................. | F16L 37/62 |
| 9,835,270 B2 * | 12/2017 | Bastesen ................... | F16L 1/26 |
| 10,465,822 B2 * | 11/2019 | Larsson .................... | F16L 1/26 |
| 2002/0179167 A1 * | 12/2002 | Latham .................... | F16L 55/46 15/104.062 |
| 2008/0237957 A1 * | 10/2008 | Waldorf ............... | B25J 15/0206 269/27 |
| 2011/0186615 A1 * | 8/2011 | Gatlin .................... | B23K 9/121 228/102 |

(Continued)

FOREIGN PATENT DOCUMENTS

| | | |
|---|---|---|
| CA | 1134265 A | 10/1982 |
| EP | 2722571 A1 | 4/2014 |

(Continued)

OTHER PUBLICATIONS

Search Report issued in related Great Britain Patent Application No. GB2015574.3 dated Mar. 31, 2021, 2 pages.

*Primary Examiner* — Matthew R Buck
*Assistant Examiner* — Patrick F Lambe
(74) *Attorney, Agent, or Firm* — Baker Botts L.L.P.

(57) ABSTRACT

A subsea well intervention cap is provided. The subsea well intervention cap includes a frame, a first clamp segment coupled to the frame and configured to be fitted over a horizontally oriented flowpath of a subsea well equipment component, and a second clamp segment having a rim segment configured to interface with the first clamp segment, wherein the second clamp segment is movable with respect to the first clamp segment. The subsea well intervention cap also includes an actuation mechanism coupled to the frame that actuates the second clamp segment in a vertically upward direction and in an axial direction with respect to the frame toward the first clamp segment. The subsea well intervention cap is lightweight and able to be installed on subsea well equipment using a standard remote operated vehicle (ROV).

20 Claims, 3 Drawing Sheets

(56) References Cited

U.S. PATENT DOCUMENTS

| | | | |
|---|---|---|---|
| 2012/0160505 A1* | 6/2012 | Lonnemo | F16L 1/26 |
| | | | 166/341 |
| 2012/0199358 A1* | 8/2012 | Larsson | F16L 1/26 |
| | | | 166/341 |
| 2014/0102711 A1 | 4/2014 | Hestetun | |
| 2017/0314714 A1* | 11/2017 | Bekkevold | E21B 17/06 |

FOREIGN PATENT DOCUMENTS

| WO | 2016/174166 A1 | 11/2016 |
|---|---|---|
| WO | 2018/217099 A1 | 11/2018 |

* cited by examiner

US 11,624,253 B2

ROV-BASED SUBSEA WELL INTERVENTION CAP

CROSS REFERENCE TO RELATED APPLICATIONS

The present application claims priority to and the benefit of U.S. Provisional Application Ser. No. 62/912,902, entitled "ROV-Based Subsea Well Intervention Cap," filed on Oct. 9, 2019.

TECHNICAL FIELD

The present disclosure relates generally to a subsea well intervention cap and, more particularly, to a subsea well intervention cap that can be installed using a remote operated vehicle (ROV).

BACKGROUND

Offshore oil and gas operations typically involve drilling a wellbore through a subsea formation and disposing a wellhead at the upper end of the well (e.g., at the mudline). A string of casing can be landed in the wellhead, and a tubing spool is generally connected to the top of the wellhead. A tubing hanger lands in the tubing spool, and the tubing hanger suspends a production tubing string through the wellhead and tubing spool into the casing string. A production tree can be connected to the top of the tubing spool to route product from the tubing hanger (and production tubing) toward a production riser. Other subsea production components such as manifolds, flowline connectors, and so forth may be attached to the production tree to route product to the production riser. The production riser generally includes a series of riser pipes connected end to end to connect the subsea production components to, for example, a topside production facility. Such subsea systems are often used to extract production fluids from subsea reservoirs.

It can become necessary to permanently or temporarily abandon subsea trees and manifolds. This often involves removing the connection to the surface and capping the remaining subsea infrastructure for protection and/or to provide a secondary or tertiary barrier to the subsea well. Conventional subsea equipment caps capable of withstanding full working pressures are usually of such size and weight that they require special tooling or running devices to install the caps. These caps typically require axial (e.g., horizontal) translation to affect a connection. It is now recognized that a need exists for intervention caps for subsea well equipment that can be installed without requiring a large specially equipped vessel or specialized running tool.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
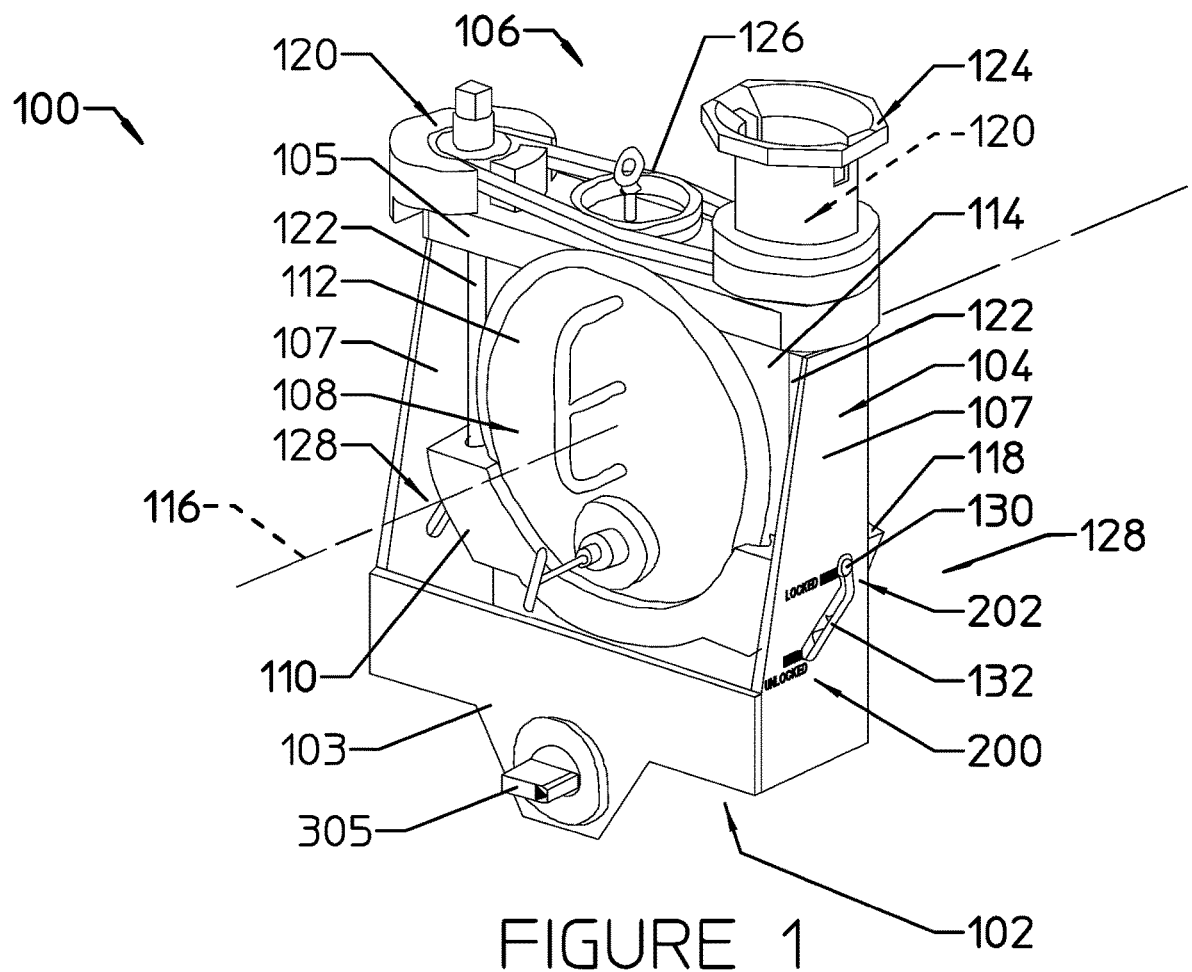
FIG. 1 is an elevation view of a remote operated vehicle (ROV) based subsea well intervention cap, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments of the present disclosure may be directed to a subsea well intervention cap that can be installed on a piece of subsea well equipment using a standard remote operated vehicle (ROV). The intervention cap can be placed on and sealed against a wellhead, a subsea flowline, a subsea manifold, a production tree, or any other desired equipment that is coupled to a production flowbore of a subsea well. The intervention cap may be used in other subsea hardware applications as well, wherever lightweight intervention is required.

The disclosed subsea well intervention cap may be particularly useful for capping a horizontally oriented flowpath of a subsea well equipment component. The intervention cap provides full pressure containment capability while eliminating the need to have special tooling and axial (e.g., horizontal) translation of the entire cap assembly for connection make-up. This is an improvement over existing subsea well intervention caps, which are typically connected to a horizontally oriented well component via specialized tooling that moves the entire cap in a horizontal direction to form the connection. This specialized tooling is expensive to use as it often must be deployed from a large workover vessel.

The disclosed subsea well intervention cap overcomes the deficiencies associated with existing intervention caps, as the system can be run, installed, and/or retrieved solely with a standard ROV. As such, the disclosed intervention cap system reduces the deployment vessel requirements to a workboat class vessel and eliminates the need for special tooling. Only vertical access is required for initially positioning the intervention cap against a horizontally oriented subsea well equipment component. That is, the ROV can simply lower the well intervention cap in a vertical direction into contact with a portion of the equipment component. Once the well cap system is initially positioned against the equipment component, the ROV may be used to actuate the well cap system, fully closing the well intervention cap against the equipment component.

The disclosed subsea well intervention cap includes a frame, a two-piece clamp assembly, and an actuation assembly. The upper section of the clamp assembly remains stationary or nearly stationary with respect to a subsea hub (i.e., end of subsea equipment to be capped), while the actuation assembly forces the lower clamp segment to move upward (e.g., vertically) and axially (e.g., horizontally) towards the hub during capping. The actuation assembly may include one or more power screws that can be operated by an ROV deployed standard torque tool.

Turning now to the drawings, FIG. 1 illustrates an embodiment of the subsea well intervention cap 100. The intervention cap 100 includes the frame 102, two-piece clamp assembly 104, and actuation assembly 106.

The frame 102, as illustrated, may include a lower portion 103, an upper portion 105, and two side walls 107 extending in a vertical direction to connect the lower portion 103 to the upper portions 105. The frame 102 provides stability for the movable components of the intervention cap 100. The frame may also provide a guide for directing movement of the lower clamp segment of the two-piece clamp assembly 104, as described in detail below.

The clamp assembly 104 functions as a well cap that closes over and seals a flowline of the subsea well equipment. The clamp assembly 104 includes a first (upper) clamp segment 108 and a second (lower) clamp segment 110. The upper clamp segment 108 may be stationary with respect to the frame 102 of the intervention cap 100. The lower clamp segment 110 is movable with respect to the frame 102 and the upper clamp segment 108. As illustrated, the upper clamp segment 108 forms a majority of the clamp assembly 104 and has a generally rounded face 112 to be fitted directly over an axial end of the subsea well equipment. The rounded face 112 forms a cover for the rounded or cylindrical flowline of the subsea well equipment.

In addition to the rounded face 112, the upper clamp segment 108 generally includes a rim segment 114 that extends from the rounded face 112 in an axial direction (i.e., a direction parallel to axis 116). The rim segment 114 extends from a radially external (with respect to axis 116) portion of the rounded face 112 to form part of a rim that will close around (and/or seal against) an outer circumference of the well equipment being capped. The rim segment 114 forms a lip around a portion of the radially external edge of the rounded face 112. This rim segment 114 is arc-shaped, extending partially around a circumference of the overall rim formed by the clamp assembly 104. For example, the rim segment 114 of the upper clamp segment 108 may span between 200 degrees and 270 degrees around the axis 116. In some embodiments, the rim segment 114 may span approximately 240 degrees around the axis 116.

The lower clamp segment 110 is a smaller component than the upper clamp segment 108. The lower clamp segment 110 is generally arc-shaped and is designed to be moved into close proximity to the upper clamp segment 108 to close the clamp assembly 104 around the corresponding well equipment component. The lower clamp segment 110 may be designed to close directly over a lower portion (in a vertical direction) of the rounded face 112 of the upper clamp segment 108, as shown in FIG. 1. This way, the lower clamp segment 110 can apply a closing/clamping force to the rounded face 112 sufficient for closing/sealing the clamp assembly 104 over the well equipment component.

Similar to the upper clamp segment 108, the lower clamp segment 110 may include a rim segment 118. The rim segment 118 extends from a radially external (with respect to axis 116) portion of the lower clamp segment 110 to form part of the rim that will close around (and/or seal against) the outer circumference of the well equipment being capped. This rim segment 118 is arc-shaped, extending partially around a circumference of the overall rim formed by the clamp assembly 104. For example, the rim segment 118 of the lower clamp segment 110 may span between 90 degrees and 160 degrees around the axis 116. In some embodiments, the rim segment 118 may span approximately 120 degrees around the axis 116. The lower clamp segment 110 essentially forms a lowermost portion of the rim of the clamp assembly 104 that closes over the subsea well equipment. The rim segment 114 of the upper clamp segment 108 and the rim segment 118 of the lower clamp segment 110 together span an entire 360 degrees around the axis 116 so as to fully close around and/or seal against the outer circumference of the well equipment component being capped. The modular design of the two-piece clamp assembly 104 of the disclosed subsea well intervention cap 100 allows for the same intervention cap 100 to be connected to most available hub profiles of horizontally oriented subsea equipment components.

When the intervention cap 100 is initially deployed, the lower clamp segment 110 is disposed in a first position with respect to the upper clamp segment 108. In the first position, the lower clamp segment 110 is spaced away from the upper clamp segment 108 in both the axial direction (parallel to axis 116) and a vertical direction (perpendicular to axis 116). An ROV moves the intervention cap 100 toward the subsea well equipment component to be capped, and the ROV lowers the intervention cap 100 such that the upper clamp segment 108 is seated against the well equipment component. The lower clamp segment 110 is then moved to a second position with respect to the upper clamp segment 108. In this second position, the lower clamp segment 110 is aligned with the upper clamp segment 108 in the axial and vertical directions. The lower clamp segment 110 is also contacting the upper clamp segment 108 and forcing the clamp assembly 104 into sealing engagement with the subsea well equipment. As such, when the lower clamp segment 110 is in the second position, the lower clamp segment 110 and upper clamp segment 108 interact to close around and/or seal against (i.e., cap) the well equipment component.

The actuation assembly 106 moves the lower clamp segment 110 with respect to the upper clamp segment 108 to close the clamp assembly 104 over the well equipment component. The actuation assembly 106 is coupled to the frame 102 and to the lower clamp segment 110 and may be designed to move the lower clamp segment 110 in a vertical direction with respect to the frame 102. The actuation assembly 106 may include any desirable mechanism that imparts vertical movement to the lower clamp segment 110. In the illustrated embodiment, for example, the actuation assembly 106 includes tandem power screws 120 coupled to the frame 102 on opposing sides of the clamp assembly 104. The power screws 120 are connected to the upper portion 105 of the frame 102, and rods 122 extend downward from the power screws 120 to connect the lower clamp segment 110 with the power screws 120. The power screws 120 each may include a rotatable component and a translating component. The rotatable component may extend upward from the frame 102 and in some cases be located within and rotated via an ROV bucket 124. The rotatable component can be rotated with respect to the frame 102 via an ROV, and the translating component of the power screw 120 is moved vertically upward with respect to the rotatable component of the power screw 120 as the screw rotates. This transfers rotation of the rotatable component of the power screws 120 into upward movement of the rods 122 and the lower clamp segment 110. The rods 122 are coupled directly to the lower clamp assembly 110 and impart upward movement to the lower clamp assembly 110 as the rods 122 are lifted with respect to the frame 102.

In some embodiments, the tandem power screws 120 may be operated independently from one another. That is, the ROV may connect directly to and physically turn both of the power screws 120 to actuate the upward movement of the lower clamp segment 110. The power screws 120 may both be turned at the same time via the use of two rotating torque tools of the ROV, or may be turned one at a time via a single torque tool.

In other embodiments, such as in the illustrated intervention cap 100, the tandem power screws 120 are operated together via a single rotating connector of the ROV. This may be accomplished using a drive chain 126 or similar element that rotationally couples the two power screws 120 together. In FIG. 1, the ROV bucket 124 provides an interface for receiving an ROV-deployed torque tool and transferring torque from the torque tool to one of the power screws 120, which then affects translation of the other power screw 120 via the drive chain 126. The ROV bucket 124 may be any desired shape capable of interfacing with a rotatable tool (e.g., ISO torque tool) of an ROV, as will be recognized by those of ordinary skill in the art.

As the power screws 120 provide vertical translation of the lower clamp segment 110, the lower clamp segment 110 is moved with respect to the upper clamp segment 108 and the frame 102 according to a pre-defined path via one or more pin/slot cam arrangements 128. The illustrated embodiment shows two such pin/slot cam arrangements 128 between the frame 102 and the lower clamp segment 110, one pin/slot cam arrangement 128 on either side of the frame 102. However, it should be noted that other embodiments may utilize a single pin/slot cam arrangement 128 on just one side of the frame 102 and the lower clamp segment 110. Although the pin/slot cam arrangement 128 is shown in the figures, any other type of keying assembly that facilitates translation of vertical movement into lateral movement may be used as well to guide the movement of the lower clamp segment 110.

The pin/slot cam arrangement 128 may include one or more pins 130 extending outward from the lower clamp segment 110 into one or more corresponding slots 132 formed in the frame 102 proximate the lower clamp segment 110. It should be understood that the cam arrangement 128 could be reversed in other embodiments. That is, the pin/slot cam arrangement 128 may instead include one or more pins 130 extending inward from the side walls 107 of the frame 102 into one or more corresponding slots formed in the lower clamp segment 110. The pin/slot cam arrangement 128 guides the movement of the lower clamp segment 110 relative to the frame 102 such that vertical movement imparted on the lower clamp segment 110 via the actuation assembly 106 causes axial movement (in direction of axis 116) of the lower clamp segment 110 as well. The lower clamp segment 110 is moved according to a pre-defined path (in both vertical and axial directions) via the one or more pin/slot cam arrangements 128.

Figure 2:
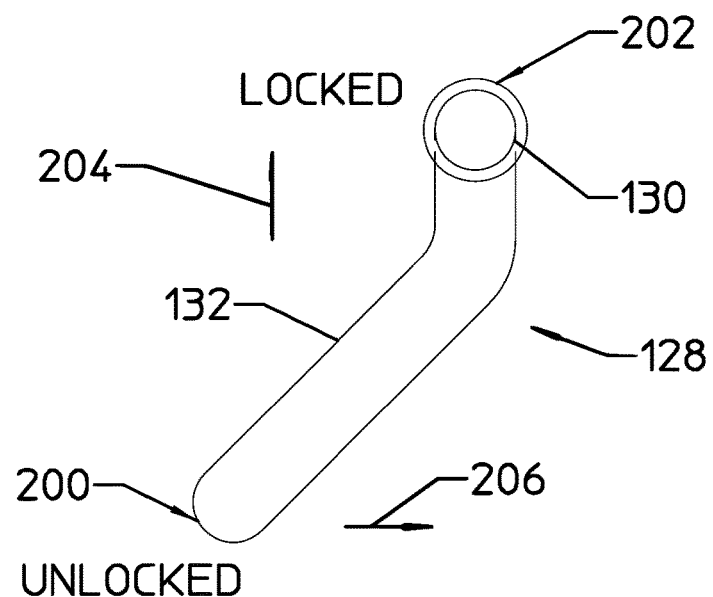
FIG. 2 is a schematic illustration of a pin/slot cam arrangement used to direct a movable clamp segment of the subsea well intervention cap of FIG. 1 from a first position into a second position, in accordance with an embodiment of the present disclosure.

A more detailed view of the pin/slot cam arrangement 128 and pre-defined path is provided in FIG. 2. One end 200 of the slot 132 is labeled "unlocked" as this corresponds to an unlocked clamp position where the lower clamp segment 110 is in the first position relative to the frame 102 as described above. An opposite end 202 of the slot 132 is labeled "locked" as this corresponds to a locked clamp position where the lower clamp segment 110 is in the second position relative to the frame 102 as described above. In moving from the "unlocked" first position to the "locked" second position, the lower clamp segment 110 is moved both in a vertical direction 204 and in an axial direction 206 as defined by the path of the slot 132. The predefined path may be linear or curved. The pin 130 is caught within the slot 132 and keeps the lower clamp segment 110 on the path defined by the slot 132. As such, when the power screws move the lower clamp segment 110 in a vertically upward direction 204, the pin/slot cam arrangement 128 also causes the lower clamp segment 110 to move in the axial direction 206 toward the subsea well equipment component.

As shown in FIG. 2, the pin 130 caught within the slot 132 may also serve as a visual indicator of the connection status of the subsea well intervention cap 100. When the pin 130 is located in the "unlocked" end 200 of the slot 132, this indicates that the intervention cap 100 is not locked to the subsea well equipment component. When the pin 130 is located in the "locked" end 202 of the slot 132, this indicates that the intervention cap 100 is secured to the subsea well equipment component. The ROV that installs the intervention cap 100 may be equipped with a camera that can be used to visually inspect the connection status of the intervention cap 100 by viewing the pin/slot cam arrangement 128.

The disclosed subsea well intervention cap 100 has improved reliability over existing subsea well intervention cap systems due to the actuation assembly 106 being a simple, dual-drive screw system that can be accessed from either side of the frame 102. The drive screws 120 may be constructed from Inconel with passive cathodic protection, thereby enabling long-term deployment of the intervention cap 100 to cap subsea well equipment.

Figure 3:
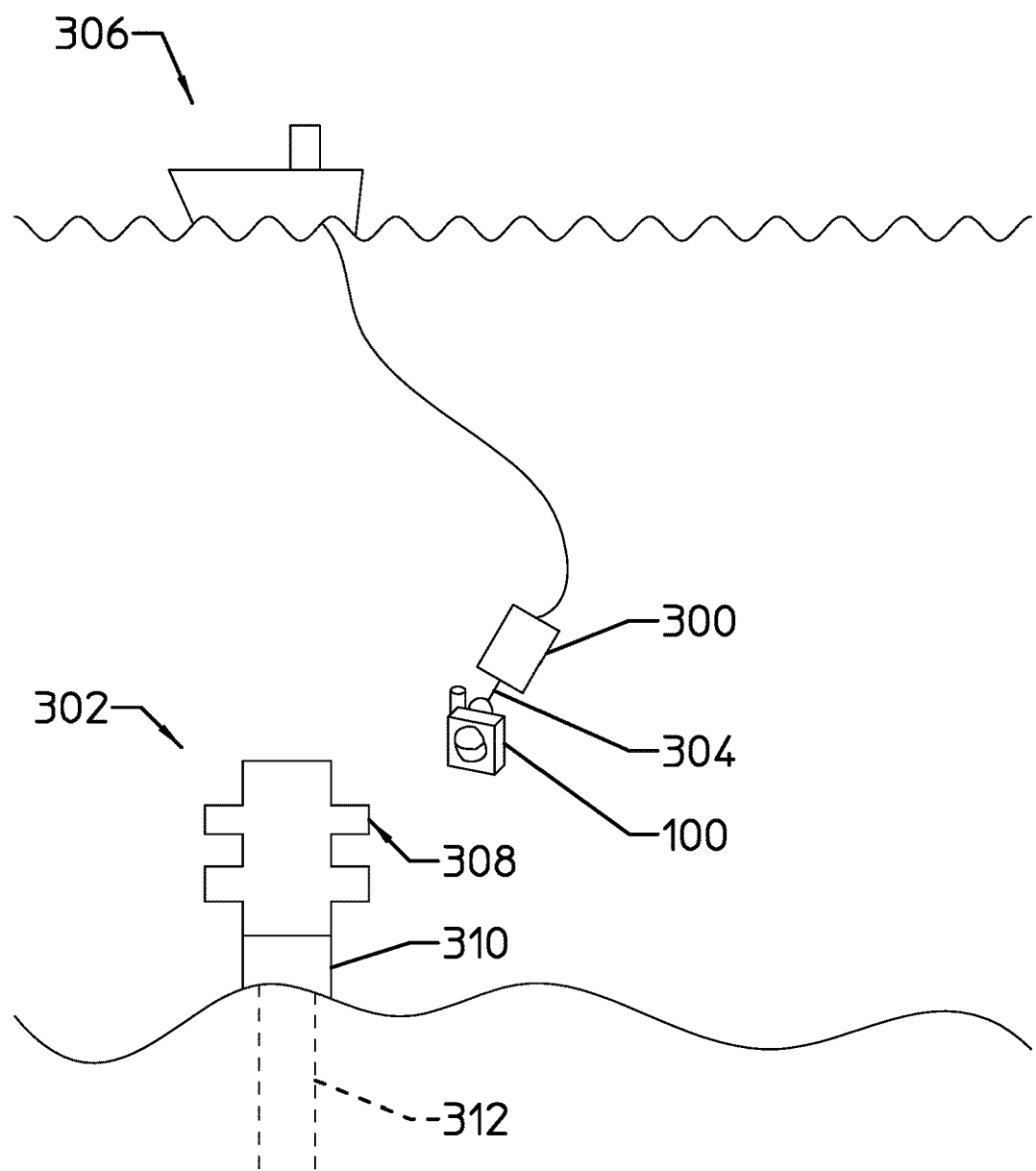
FIG. 3 is a schematic view of an ROV moving the subsea well intervention cap of FIG. 1 into a position for installation of the cap on a subsea equipment component, in accordance with an embodiment of the present disclosure.

FIG. 3 illustrates an ROV 300 being used to deploy the disclosed subsea well intervention cap 100 toward a subsea well equipment component 302. The ROV 300 may be attached to the well intervention cap 100 via a suitable attachment mechanism 304 of the ROV 300 and lowered with the attached intervention cap 100 from a vessel 306 located at a surface of the water. In some embodiments, the attachment mechanism 304 of the ROV may include a mechanism that grips a corresponding feature (e.g., feature 305 of FIG. 1) on the frame of the intervention cap 100. The ROV 300 and attached intervention cap 100 may be deployed from the vessel 306 toward the subsea well equipment component 302 in a conventional fashion. The vessel 306 may be a standard workboat class vessel. The ROV 300 may lower the intervention cap 100 to a subsea location adjacent a horizontally oriented flowline 308 of the equipment component 302 to be capped. As illustrated, the equipment component 302 may in certain embodiments include a subsea production tree located on a wellhead 310 of a subsea well 312. However, other types of subsea equipment having a horizontal flowline may be capped using the intervention cap 100 as well, including, e.g., wellheads, subsea flowlines, subsea manifolds, and other components.

The disclosed subsea well intervention cap 100 may a lightweight pressure/debris cap that can be installed onto the existing subsea infrastructure (e.g., equipment component 302) using only an ROV 300, as shown in FIG. 3. Any simple work-class ROV having an ISO torque tool can be used to install, test, depressurize, and remove the intervention cap 300. No additional or special support (e.g., a rig) is needed at the vessel 306 during installation or retrieval of the intervention cap 100. As such, the disclosed intervention cap 100 reduces the operating expense of capping horizontal flowlines of subsea well equipment components. Using the disclosed lightweight intervention cap 100 to cap these horizontal flowlines also reduces the expense associated with performing workover or temporary well abandonment operations on the subsea well equipment by providing protection to the subsea manifolds/templates.

Figure 4A:
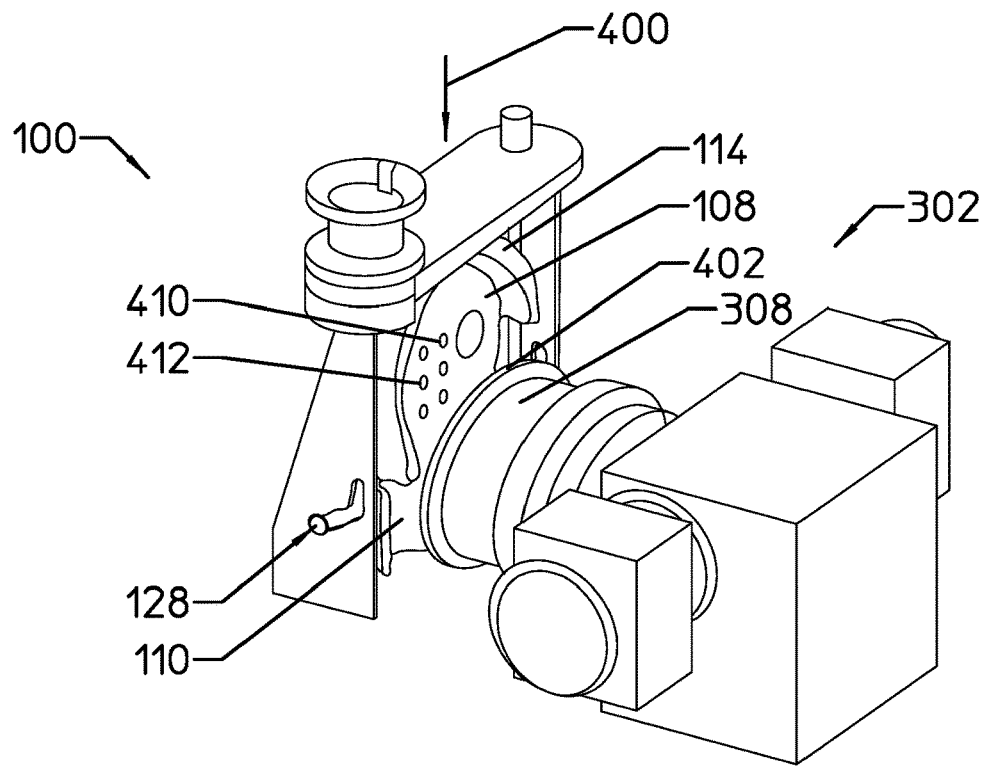
FIGS. 4A and 4B are elevation views of the subsea well intervention cap of FIG. 1 being installed onto a subsea equipment component, in accordance with an embodiment of the present disclosure.
Figure 4B:
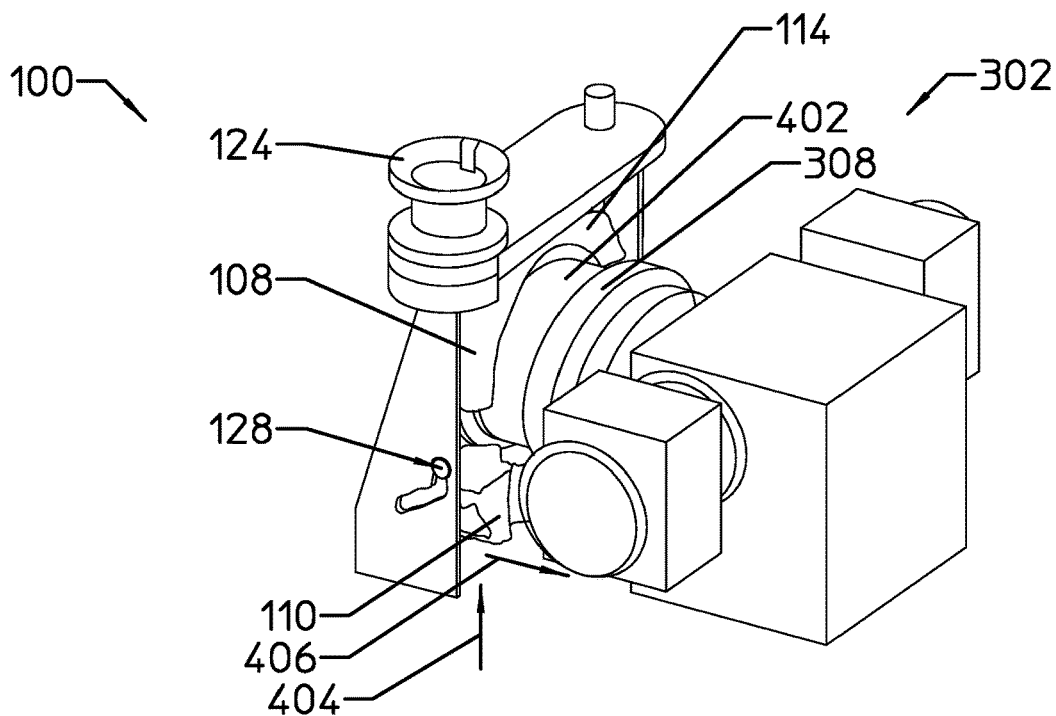

FIGS. 4A and 4B illustrate the disclosed subsea well intervention cap 100 being installed onto the subsea equipment component 302. Upon the ROV (e.g., 300 of FIG. 3) and attached intervention cap 100 reaching the subsea equipment component 302, the ROV may initially position the intervention cap 100 (which is in the "unlocked" configuration) at a position vertically above a hub 402 of the horizontal flowline 308 to be capped. This is shown in FIG. 4A. The ROV then lowers the entire intervention cap 100 in a vertically downward direction 400 until the rim segment 114 of the upper clamp segment 108 seats along upward and side facing portions of the hub 402 at an axial end of the horizontal flowline 308. In some embodiments, the rim segment 114 may seat against a flange extending from the hub 402 at its axial end. In this partially connected position of the intervention cap 100, the upper clamp segment 108 may be seated over the horizontal flowline portion 308 of the well equipment component 302. The upper clamp segment 108, including the rounded face 112, may be loosely seated over the horizontal flowline 308 at this time during deployment of the intervention cap 100.

From here, the ROV may interface with the bucket 124 to rotate the one or more drive screws of the well intervention cap 100, thereby actuating the lower clamp segment 110 to fully close the intervention cap 100 over the horizontal flowline 308. FIG. 4B shows the well intervention cap 100 in this fully closed position. The rotational movement of the actuation assembly 106 causes the lower clamp segment 110 to move both in a vertically upward direction 404 and in an axial direction 406 toward the flowline 308, as described in detail above with reference to FIGS. 1 and 2. This movement of the lower clamp segment 110 brings the lower clamp segment 110 into contact with both the upper clamp segment 108 and a downward facing portion of the hub 402 at the end of the horizontal flowline 308. In some embodiments, the lower clamp segment 110 may seat against a flange extending from the hub 402 at its axial end. The lower clamp segment 110 may be moved into sealing contact with both the well equipment component 302 and the upper clamp segment 108 so that the clamp assembly covers and seals against the horizontal flowline 308 of the well equipment component 302. At this point, the well equipment component 302 is capped via the well intervention cap 100.

As mentioned above, the ROV can lower the intervention cap 100 into the partially connected position (e.g., FIG. 4A) entirely from the vertical, and then the ROV imparts rotation to the actuation mechanism 106 for moving the lower clamp segment 110 into the closed/locked position of FIG. 4B. Since this is accomplished via only vertical movement of the entire subsea well intervention cap 100 in the aggregate (as opposed to horizontal movement), no specialized rig or vessel equipment is needed to lock the cap over the horizontal flowline 308. The arrangement of the disclosed intervention cap 100 provides a unique installation process whereby the cap 100 is installed entirely from the vertical.

After installing the well intervention cap 100, the ROV may detach from the intervention cap 100 and be retrieved to the surface or used in other desired subsea operations. In some embodiments, the ROV may perform testing of the installed intervention cap 100 to confirm that it is fully closed and/or sealed against the well equipment component 302, as well as any other desired operations on the intervention cap 100.

The intervention cap 100 may be self-locking such that it will remain safely locked until it is mechanically unlocked by a standard subsea torque tool and interface via the same or a different ROV. The intervention cap 100 may be capable of sealing against maximum production bore pressure on single or multiple bore configurations of well equipment 302. The intervention cap 100 may include equipment on the rounded face 112 thereof (e.g., as shown in FIG. 1) that enables pressure testing and/or venting of the horizontal flowline over which the cap is placed. The flowline 308 may be vented via a vent in the intervention cap prior to removal of the intervention cap 100. The intervention cap 100, once installed, may have a maximum operating pressure of up to 15,000 psi. The intervention cap 100 may be equipped with one or more sensors (410 of FIG. 4A) to detect a pressure or other operating conditions within the flowline 308 that is sealed by the intervention cap 100. The intervention cap 100 may also be equipped with a communication device 412 for communicating signals indicative of the information detected by the sensors 410 to a local memory storage component, a subsea control/monitoring component, or a surface level control/monitoring component for continuous monitoring of the flowline conditions.

In some embodiments, the lower clamp segment 110 may be a disposable piece designed to fall away from the upper clamp segment 108 and the rest of the intervention cap 100 upon detachment of the well intervention cap from the well equipment component 302.

Although the present disclosure and its advantages have been described in detail, it should be understood that various changes, substitutions and alterations can be made herein without departing from the spirit and scope of the disclosure as defined by the following claims.

What is claimed is:

1. A subsea well intervention cap, comprising:
a frame;
a first clamp segment coupled to the frame and configured to be fitted over an end of a horizontally oriented flowpath of a subsea well equipment component, the horizontally oriented flowpath extending in an axial direction, wherein the first clamp segment has a rounded face sized to cover the opening at the end of the horizontally oriented flowpath so as to form a cap that prevents fluid flow out of the subsea well equipment component;
a second clamp segment having a rim segment configured to interface with the first clamp segment, wherein the second clamp segment is movable with respect to the first clamp segment; and
an actuation mechanism coupled to the frame and configured to selectively move the second clamp segment with respect to the first clamp segment in a vertically upward direction and in the axial direction toward the opening at the end of the horizontally oriented flowpath when the first clamp segment is fitted over the end of the horizontally oriented flowpath.

2. The subsea well intervention cap of claim 1, wherein the first clamp segment is stationary with respect to the frame.

3. The subsea well intervention cap of claim 1, wherein the first clamp segment has a rim segment that extends from the rounded face in the axial direction, wherein the rim segment of the first clamp segment is arc-shaped and traces part of a circumference of the rounded face.

4. The subsea well intervention cap of claim 3, wherein the rim segment of the first clamp segment extends circumferentially between 200 degrees and 270 degrees.

5. The subsea well intervention cap of claim 3, wherein the rim segment of the second clamp segment is arc-shaped and traces a remainder of the circumference of the rounded face.

6. The subsea well intervention cap of claim 1, wherein the actuation mechanism comprises one or more power screws coupled to the frame, wherein the one or more power screws each comprise a rotatable component and a translating component.

7. The subsea well intervention cap of claim 6, wherein the actuation mechanism further comprises one or more rods extending vertically from the one or more power screws to connect the second clamp segment to the one or more power screws, wherein rotation of the one or more power screws causes vertical movement of the one or more rods and of the attached second clamp segment.

8. The subsea well intervention cap of claim 6, wherein the one or more power screws comprise two tandem power screws coupled together via a drive chain, wherein the tandem power screws are operable in response to rotation from a single remote operated vehicle (ROV) connector.

9. The subsea well intervention cap of claim 1, further comprising a pin/slot cam arrangement between the frame and the second clamp segment that guides movement of the second clamp segment with respect to the frame, wherein the pin/slot cam arrangement comprises one or more pins extending from one of the frame or the second clamp segment into one or more corresponding slots formed in the other of the frame or the second clamp segment.

10. The subsea well intervention cap of claim 1, wherein the actuation mechanism is configured to selectively move the second clamp segment with respect to the frame in the vertically upward direction and in the axial direction toward the opening at the end of the horizontally oriented flowpath.

11. A method, comprising:
deploying a subsea well intervention cap to a location proximate a subsea well equipment component having a horizontally oriented flowpath, the horizontally oriented flowpath extending in an axial direction, wherein the subsea well intervention cap comprises:
a frame;
a first clamp segment coupled to the frame, wherein the first clamp segment has a rounded face sized to cover an opening at an end of the horizontally oriented flowpath;
a second clamp segment having a rim segment; and
an actuation mechanism coupled to the frame;
fitting the first clamp segment over the end of the horizontally oriented flowpath with the second clamp segment in a first position spaced away from the first clamp segment in both a vertical direction and the axial direction; and
moving the second clamp segment from the first position to a second position via the actuation mechanism, the movement of the second clamp segment being in a vertically upward direction and in the axial direction toward the opening at the end of the horizontally oriented flowpath, wherein in the second position the second clamp segment interacts with the first clamp segment to close over the horizontally oriented flowpath of the subsea well equipment component so as to form a cap that prevents fluid flow out of the subsea well equipment component.

12. The method of claim 11, wherein the subsea well equipment component comprises a subsea wellhead, a subsea flowline, a subsea manifold, or a subsea production tree.

13. The method of claim 11, wherein the first clamp segment further comprises a rim segment that extends from the rounded face in the axial direction, wherein the rim segment of the first clamp segment is arc-shaped and traces part of a circumference the rounded face; and wherein the second clamp segment is arc-shaped and traces a remainder of the circumference of the rounded face compared to the rim segment of the first clamp segment.

14. The method of claim 11, wherein moving the second clamp segment from the first position to the second position comprises exerting a force in a vertically upward direction from the actuation mechanism to the second clamp segment.

15. The method of claim 14, wherein actuating the actuation mechanism comprises rotating a rotatable component of one or more power screws with respect to the frame and transferring the rotation into a vertical movement of a translating component of the one or more power screws, the translating component being coupled to the second clamp segment.

16. The method of claim 14, wherein moving the second clamp segment from the first position to the second position further comprises guiding the second clamp segment along a pre-defined path in the vertical direction and the axial direction via a pin/slot cam arrangement between the second clamp segment and the frame.

17. The method of claim 11, further comprising installing the subsea well intervention cap onto the well equipment component using a standard remote operated vehicle (ROV).

18. The method of claim 17, wherein deploying the subsea well intervention cap comprises attaching the subsea well intervention cap to the ROV and deploying the ROV with the subsea well intervention cap from a standard workboat class vessel.

19. The method of claim 17, further comprising positioning the subsea well intervention cap at a position vertically above a hub of the horizontal flowpath via the ROV, and vertically lowering the subsea well intervention cap via the ROV until the first clamp segment contacts the hub prior to moving the second clamp segment from the first position to the second position.

20. The method of claim 11, further comprising sealing the horizontal flowpath via the first and second clamp segments when the second clamp segment is in the second position.

* * * * *